US005996790A

United States Patent [19]
Yamada et al.

[11] Patent Number: 5,996,790
[45] Date of Patent: Dec. 7, 1999

[54] WATERTIGHT EQUIPMENT COVER

[75] Inventors: Masahiro Yamada, Kanagawa; Kiichi Sandow, Tokyo; Hiroyuki Inagawa, Misato, all of Japan

[73] Assignee: Asahi Research Corporation, Tokyo, Japan

[21] Appl. No.: 09/105,556

[22] Filed: Jun. 26, 1998

[51] Int. Cl.$^6$ ................................................. B65D 85/38
[52] U.S. Cl. ...................................... 206/316.1; 206/811
[58] Field of Search ............................. 206/316.1, 316.2, 206/811

[56] References Cited

U.S. PATENT DOCUMENTS

| | | |
|---|---|---|
| 1,156,441 | 10/1915 | Stearns . |
| 1,535,312 | 4/1925 | Hosking . |
| 3,036,506 | 5/1962 | Andresen . |
| 4,033,392 | 7/1977 | Less . |
| 4,071,066 | 1/1978 | Schaeffer ............................. 206/316.2 |
| 4,176,701 | 12/1979 | Welgan ................................ 206/316.2 |
| 4,882,600 | 11/1989 | Van De Moere . |
| 4,982,841 | 1/1991 | Goedecke . |
| 5,092,458 | 3/1992 | Yokoyama ........................... 206/316.2 |
| 5,239,323 | 8/1993 | Johnson . |
| 5,285,894 | 2/1994 | Kamata et al. . |
| 5,325,139 | 6/1994 | Matsumoto . |
| 5,337,891 | 8/1994 | Toth ..................................... 206/316.2 |
| 5,456,277 | 10/1995 | Pontius, Jr. . |
| 5,669,020 | 9/1997 | Hopmeyer . |

*Primary Examiner*—Paul T. Sewell
*Assistant Examiner*—J. Mohandesi
*Attorney, Agent, or Firm*—Mayer, Brown & Platt

[57] ABSTRACT

A watertight equipment cover for outdoor or marine use that includes an interior and exterior surface, with the interior surface configured to fit substantially adjacent to and to completely enclose a piece of equipment such as photographic equipment or portable electronic equipment. The cover includes transparent portions that allow, as required for operation, either the equipment to transmit or receive light, or the operator to view specific areas of the equipment while the equipment is enclosed in the cover. The cover further includes resiliently deformable portions that enable operation of the equipment control functions while the equipment is enclosed in the cover. The cover further includes a watertight sealing mechanism that is sealable and resealable by the end user. An outdoor or marine protective cover system that includes a watertight cover and a piece of equipment.

38 Claims, 3 Drawing Sheets

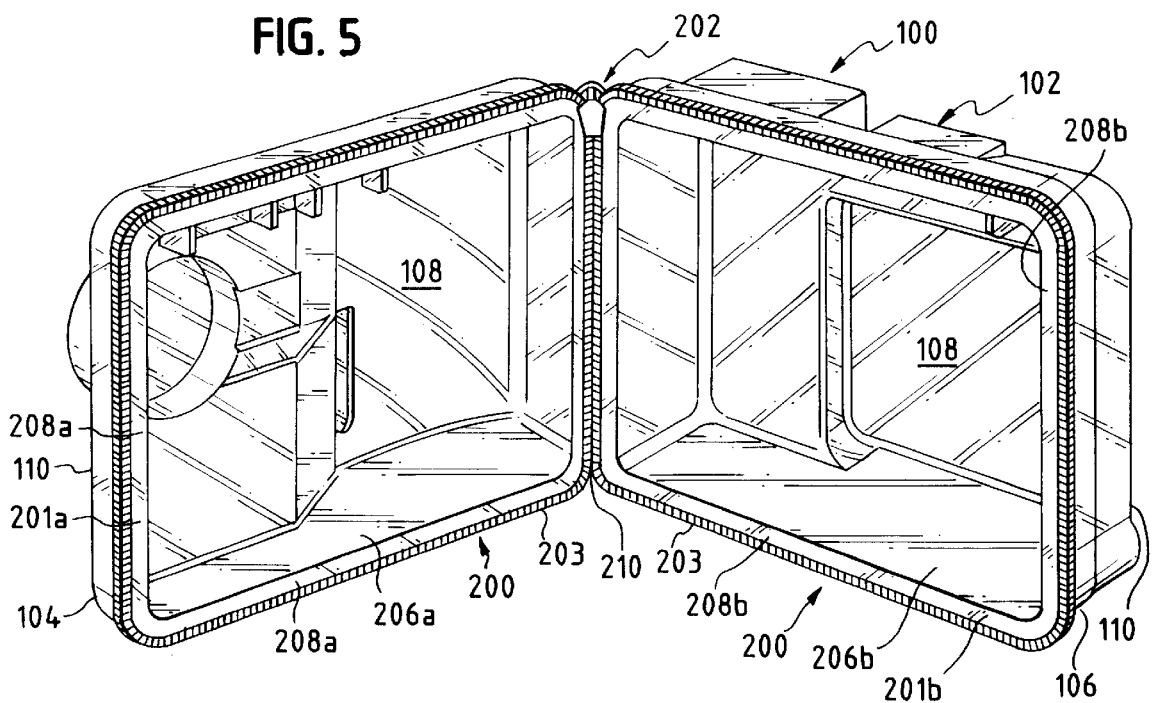
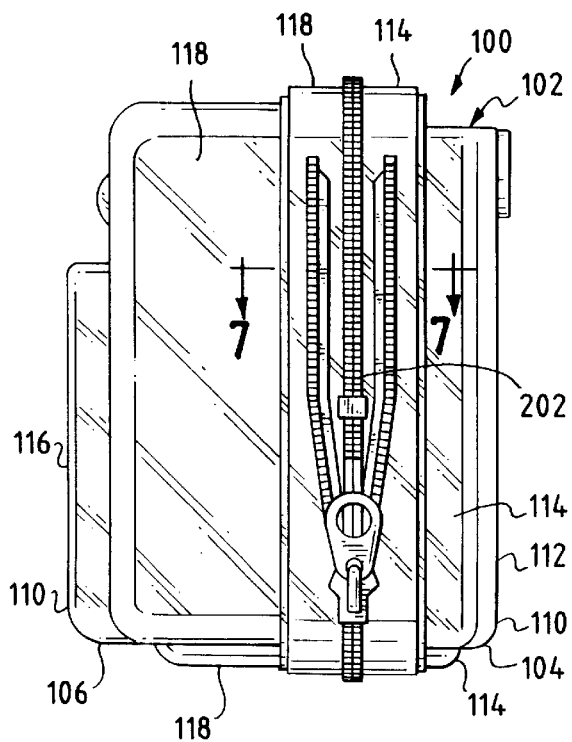
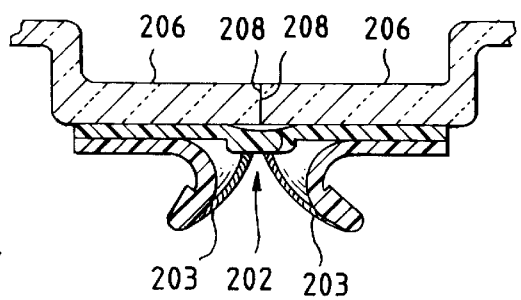

WATERTIGHT EQUIPMENT COVER

BACKGROUND OF THE INVENTION

1. Field of the Invention

The present invention relates to a cover for enclosing equipment in a watertight fashion while permitting operation of the equipment. Particularly, the present invention is directed to a cover that enables the enclosed equipment to be easily transported and operated, and that includes an entry that is both watertight and easy to seal and reseal.

2. Description of the Related Art

Weatherproof equipment cases are well known and have been available for a number of years. These equipment cases have been widely used in commercial applications such as cinematography, and professional photography, as well as in recreational applications.

U.S. Pat. No. 4,033,392 discloses an embodiment of a known weatherproof camera case. In this embodiment, the camera case includes a sealable opening through which the camera may be inserted for enclosure in the case. The case further includes a second opening in the camera case positioned such that when a camera is enclosed, the second opening is adjacent the area on the body of the camera that receives a lens. When the camera body is enclosed within the case, the camera lens extends into the second opening and may be attached to both the camera body and second opening such that the lens extends exteriorly of the case and is exposed to the environment.

U.S. Pat. No. 4,982,841 discloses a protective envelope for a video camera. The protective envelope is loosely constructed to partially conform to various camera shapes, and includes a front window through which the camera lens can receive images for filming. Disposed inside of the protective envelope, below the front window, is a supporting device and spacer to which a camera may be mounted. The protective envelope when draped over a camera provides space between portions of the camera body and the front window. The supporting device and spacer are used to adjust the distance between the front window and the camera auto focus system.

U.S. Pat. No. 3,036,506 discloses a camera for underwater photography. In this embodiment, the case loosely surrounds the camera. The case is flexible to permit manual manipulation of camera elements while a camera is enclosed in the case. The case, however, is amply sized to accommodate one or more cameras and therefore can impede operation of the enclosed camera and increases the likelihood of severe mishandling such as dropping. A transparent window is fastened in a leak-proof manner to one end of the case. The opposite end of the case is open so that the camera may be inserted and removed therefrom. The open end may be sealed with a clamp to protect against water leakage.

U.S. Pat. Nos. 5,285,894, 5,325,139 and 4,882,600 each disclose camera cases for underwater picture taking. However, each of these patents is directed to camera cases that are not resealable by the end-user for repeated use after all of the enclosed camera's film has been exposed.

In view of the above, there remains a need for a water-impermeable equipment case that completely encloses a piece of equipment, that permits operation of the enclosed equipment's operable features, that substantially conforms to the shape of the equipment, so that the cover does not gather, bunch, or otherwise substantially impede the operation and handling of the enclosed equipment, and that is sealable and resealable by the end-user.

SUMMARY OF THE INVENTION

The purpose and advantages of the invention will be set forth in and apparent from the description and drawings that follow below, as well as will be learned by practice of the invention. Additional advantages of the invention will be realized and attained by the elements of the apparatus particularly pointed out in the appended claims.

To achieve these and other advantages and in accordance with the purpose of the invention, as embodied and broadly described herein, a watertight equipment cover is provided for enclosing a piece of equipment while permitting operation of the enclosed equipment. Particularly, the present invention includes a housing that substantially corresponds to the shape and configuration of the equipment and that includes a resealable entry for inserting and removing the equipment. In this manner, the equipment cover of the present invention provides a protective cover for outdoor and marine use of electronic apparatuses, such as portable telephones, mobile computers, and photographic equipment.

In the present invention, the housing includes an inner surface and an outer surface. The inner surface defines an interior chamber for receiving the equipment, and is configured to substantially correspond to the shape of the equipment such that when the equipment is enclosed in the housing, the interior surface of the housing is substantially adjacent to the exterior surface of the equipment.

For simplicity of explanation, the discussion of the preferred embodiment is primarily directed to an equipment cover for a camera. In the preferred embodiment, the housing consists of a front and a back piece. The front piece includes a front face and four side walls. The back piece includes a back face and four side walls. The front and back pieces join together at the corresponding side walls such that the inner surfaces of the front and back faces, and the eight side walls define the interior chamber. Preferably, the housing is constructed generally of a flexible, waterproof polymer such as transparent polyurethane.

The housing of the present invention further includes resiliently deformable portions formed in one or more walls. The resiliently deformable portions are located at positions in the one or more walls such that when the equipment is enclosed within the housing, the resiliently deformable portions are located substantially adjacent to and allow operation of the operable features of the equipment. The operable features are those control features located in the surface of the equipment that must be manipulated by an operator to operate the equipment. Where necessary, to aid the operator in using the equipment, the resiliently deformable portions may have indications, such as letters or numbers corresponding to an enclosed keypad, imprinted or overlaid thereon using conventional or other appropriate techniques. Alternatively, the resiliently deformable portions may be transparent or semi-transparent if the corresponding operable features of the equipment must be seen by the operator.

For example, in the case of a camera, the operable features are those control features located in the camera exterior that are needed to take photographs. In the preferred embodiment, when a camera is enclosed in the case, the resiliently deformable portions are located substantially adjacent the camera shutter control button and the camera flash control switch. The resiliently deformable portions also may be positioned substantially adjacent the camera film advance wheel, film rewind button or the like.

The housing of the preferred embodiment of the present invention further includes transparent portions. The transparent portions are positioned in one or more housing walls substantially adjacent to the viewer areas of the equipment that either must be seen by an operator or must transmit or receive light through the housing to operate properly. In the case of a camera, the transparent portions are positioned such that when a camera is enclosed in the housing, the light-receiving, picture-taking features in the camera's exterior surface, such as the camera lens, may operate in a substantially unhindered fashion. Preferably, the housing for a camera includes at least three transparent portions. Two transparent portions are located in the front face of the housing and one transparent portion is located in the back face of the housing. The transparent portions are configured and positioned so that when a camera is enclosed: one of the transparent portions in the front face is substantially adjacent to and allows substantially unhindered operation of the camera lens, the other transparent portion in the front face is substantially adjacent to and allows substantially unhindered operation of the camera flash, and the transparent portion in the back face is substantially adjacent to and allows substantially unhindered operation of the camera viewfinder.

For a portable telephone or mobile computer, at least one transparent portion is configured and positioned to correspond to an enclosed view screen. Preferably, additional transparent portions are configured and positioned to be substantially adjacent to the equipment's viewer areas, such as a keypad or keyboard, that the operator must see to operate. In this manner, some of the operable features and some of the viewer areas of the equipment may be one and the same, and correspondingly, the resiliently deformable portions and the transparent portions may comprise some of the same portions of the housing.

The housing of the present invention further includes a housing entry. The housing entry includes a resealable, watertight sealing mechanism. The sealing mechanism is operable between open and closed positions. When the sealing mechanism is in the open position, the interior chamber may be exposed to receive the equipment.

In the camera cover of the preferred embodiment, the sealing mechanism, preferably a zipper, is disposed along the housing entry, so that (1) when the sealing mechanism is in the closed position, the housing is sealed in a watertight manner; and (2) when the sealing mechanism is in the open position, the housing may be opened such that the front face and back face lay in the same plane.

The housing entry of the preferred embodiment includes two sealing flaps, each disposed along an opposite edge of the housing entry. The sealing flaps are located in close proximity to and interiorly of the sealing mechanism. The sealing flaps are positioned so that when the sealing mechanism is in the closed position, the edges of one sealing flap engage the laterally opposite edges of the other sealing flap. In this manner, both the sealing mechanism and the engaged sealing flaps create a barrier to water penetration.

It is to be understood that both the foregoing general description and the following detailed description are exemplary and are provided for purposes of explanation only, and are not restrictive of the invention as claimed.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

FIG. 5 is a front perspective view of a representative embodiment of the cover of the present invention in the open position.

FIG. 6 is a side elevation view of the cover shown in FIG. 1.

FIG. 7 is a cross-sectional view of a representative embodiment of the sealing mechanism and sealing flaps.

DETAILED DESCRIPTION OF THE PREFERRED EMBODIMENT

In accordance with the present invention, a watertight equipment cover is provided for enclosing equipment, such as a camera, portable telephone, or mobile computer, while permitting operation of the enclosed equipment. In particular, the cover is configured to substantially conform to the shape of either a particular make and model or a particular class of equipment. Thus, the cover is either custom-made or semi-custom made for the equipment that is to be enclosed. In this manner, the cover and enclosed equipment easily may be manipulated with reduced risk of mishandling such as by dropping, and with reduced risk of the cover distorting any photographs or other images produced by the enclosed equipment. Further, the present invention includes a resealable opening, in the form of a sealing mechanism, that enables the end user to insert the equipment into or remove the equipment from the cover.

Figure 1:
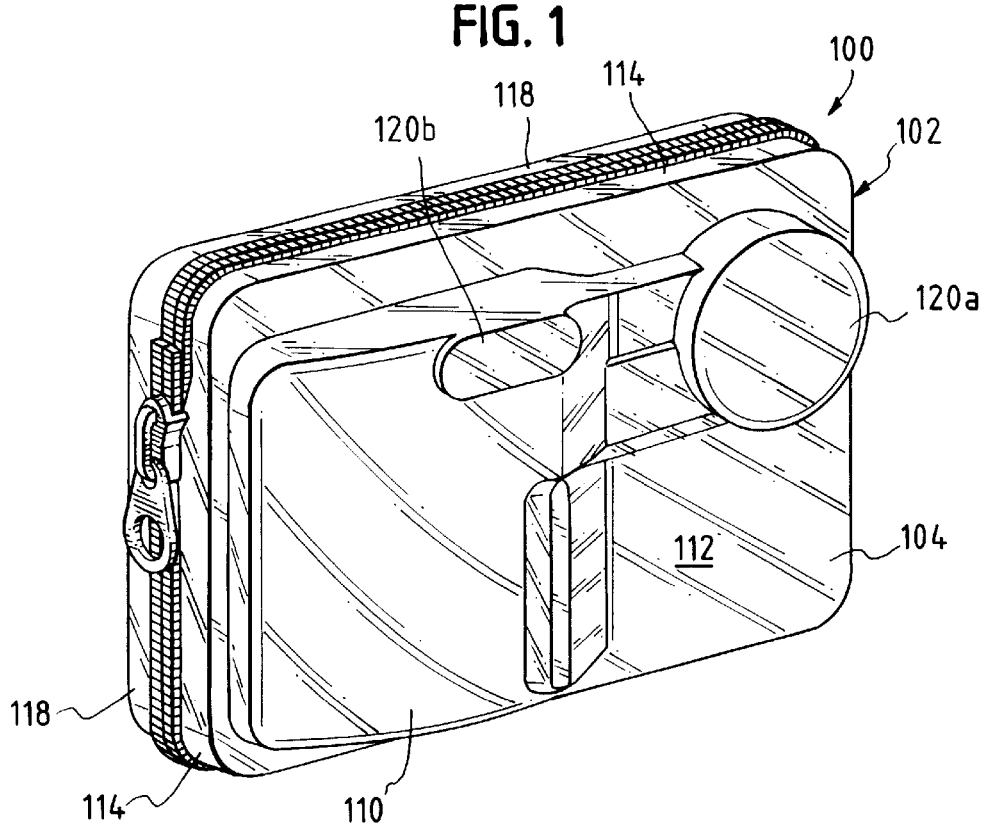
FIG. 1 is a front perspective view of a representative embodiment of the cover of the present invention in the closed position.

For simplicity of explanation, the description of the preferred embodiment, and alternatives thereto will be made with primary reference to an equipment cover for a camera. It should be understood, however, that the same principles apply to equipment covers for outdoor and marine use of other photographic equipment and electronic apparatuses, such as portable telephones and mobile computers, that are the subject matter of the present invention. For purposes of illustration, not limitation, FIG. 1 shows a representative embodiment of the watertight equipment cover 100 for a camera. The cover includes generally a housing 102, a housing entry 200 and a sealing mechanism 202.

Figure 2:
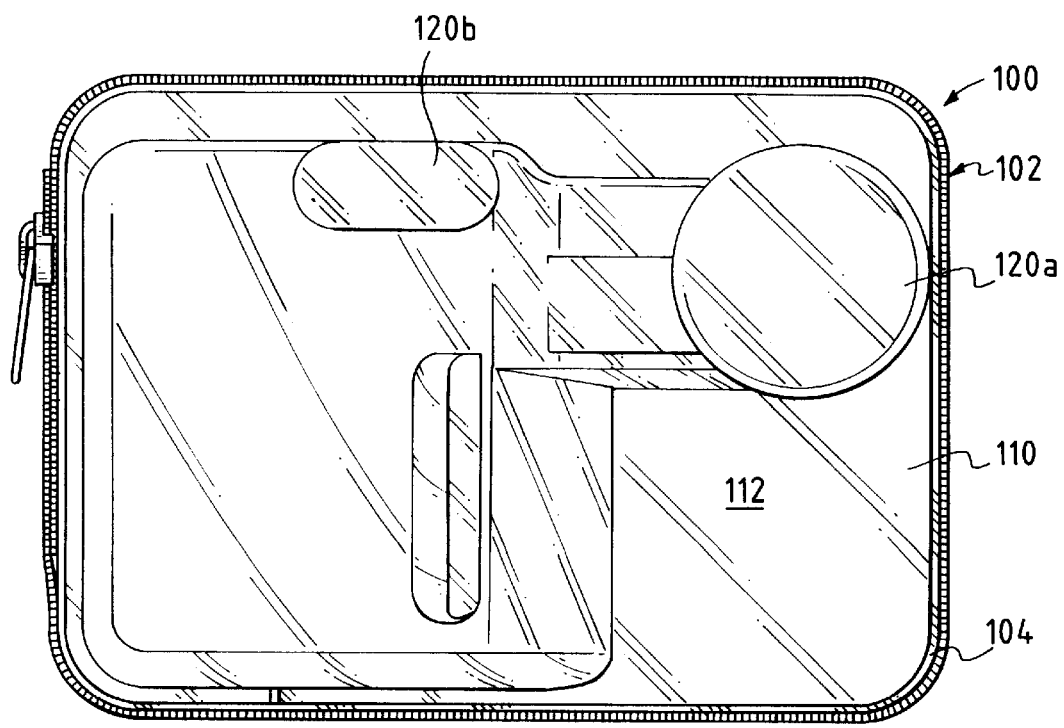
FIG. 2 is a front elevation view of the cover shown in FIG. 1.
Figure 3:
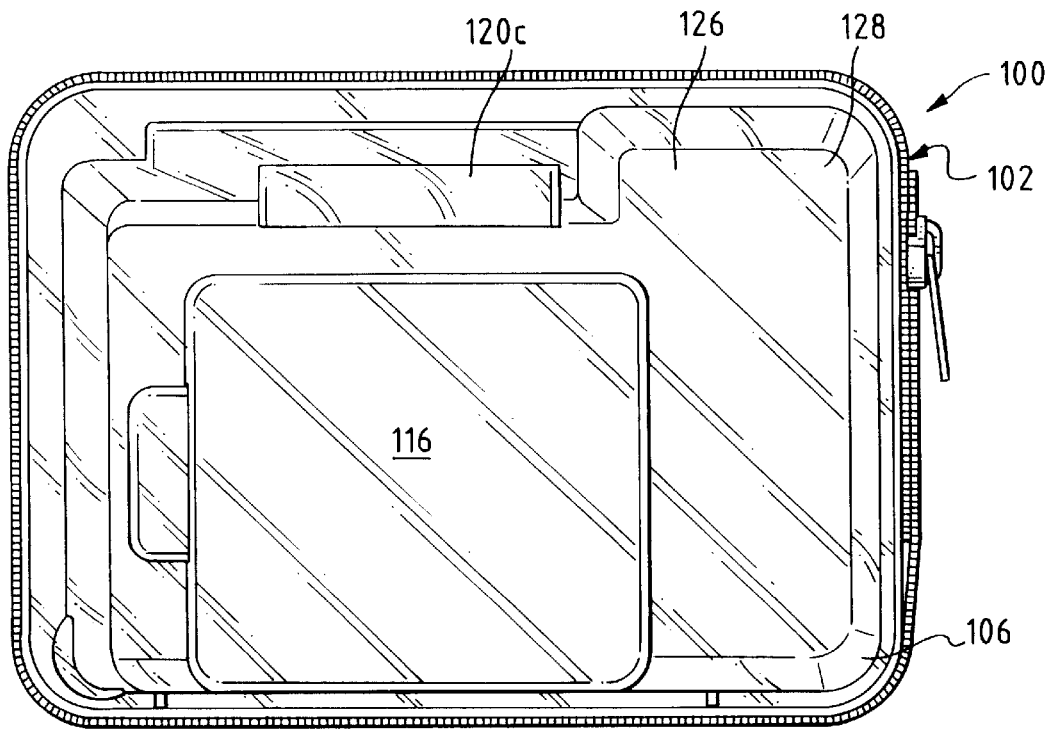
FIG. 3 is a rear elevation view of the cover shown in FIG. 1.
Figure 4:
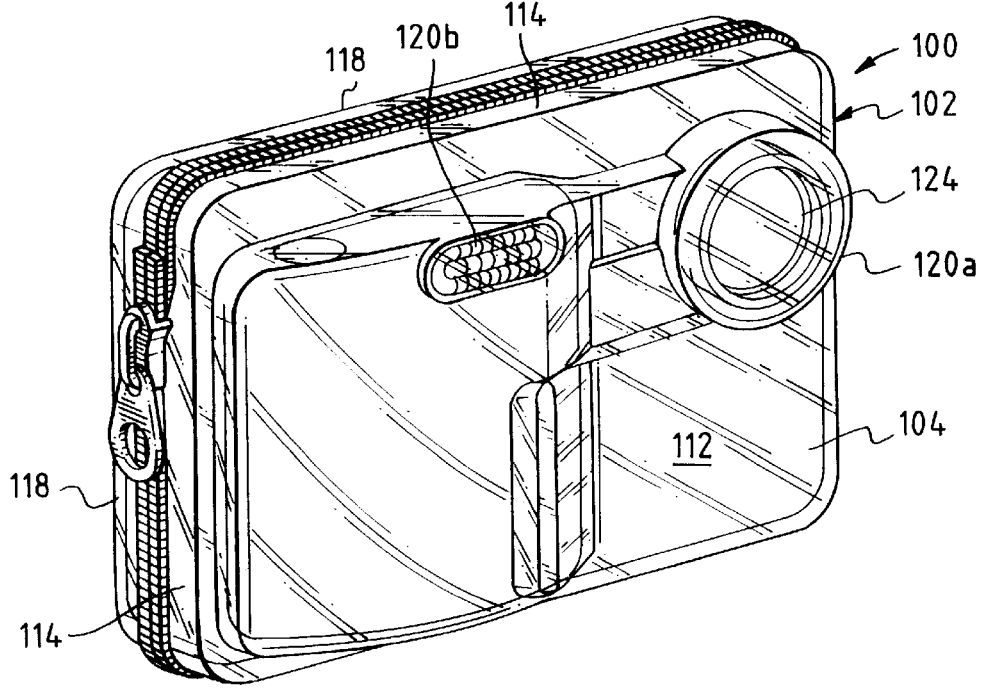
FIG. 4 is a front perspective view of the cover shown in FIG. 1 with a camera enclosed.

The housing 102 includes a front piece 104 and a back piece 106 (shown in FIG. 3) which together comprise an inner surface 108 (best shown in FIG. 5) and a corresponding outer surface 110. The front piece 104 includes a front face 112 and four sides 114. Similarly, the back piece 106 includes a back face 116 and four sides 118. The front piece 104 and back piece 106 are configured so that when the cover 100 is in the closed position, as shown in FIGS. 1–3, the front piece 104 and back piece 106 define an interior chamber 119 which substantially conforms to the shape of a particular camera make and model. Alternatively, the front piece 104 and back piece 106 may be configured so that the interior chamber 119 substantially conforms to the shape of a particular class of cameras. FIG. 4 illustrates the cover of the present invention in a closed position with a camera 121 contained within inner chamber 119. The equipment cover 100 substantially conforms to the shape of the camera 121.

In the preferred embodiment, the front piece 104 and back piece 106 are integrally formed and continuous along one interface between sides 114 and 118. This interface is illustrated at 210 in FIG. 5. It should be understood that the greater proportion of the interface between front piece 104 and back piece 106 that is continuously formed, the greater waterproofing characteristics the cover provides. It should also be understood that the amount of the interface continuously formed must be balanced against the ability to place the camera into the inner chamber with as little interference as possible. It has been found that a single interface between sides 114 and 118 provides both adequate waterproofing characteristics and ease of inserting or removing the camera into or from the cover, however, more or less interface between the front piece 104 and back piece 106 is operationally acceptable.

Preferably, the housing 102 is constructed of waterproof, flexible, transparent elastomer such as polyurethane. Although flexible, the equipment cover of the preferred embodiment maintains its shape, which substantially conforms to the shape of the camera, whether or not the camera is enclosed. As an alternative to elastomer, the housing may be constructed of a water-resistant material such as natural rubber, or any other flexible waterproof material suitable for the purposes of this invention. As an alternative to a transparent housing, the housing may be semi-transparent or opaque. The housing 102 may be constructed using conventional, or other suitable, techniques such as injection molding.

In the preferred embodiment, the housing includes transparent portions. The transparent portions are positioned in the housing to be substantially adjacent to the viewer areas of the equipment. The viewer areas are those areas of the enclosed equipment that either must be seen by the operator or must transmit or receive light through the housing. As best shown in FIGS. 3 and 4 of the preferred embodiment, the transparent portions 120 are substantially adjacent to the light-receiving, picture-taking features located in the exterior surface of the enclosed camera. The transparent portions 120 are configured to allow substantially unhindered picture taking while the camera is enclosed in the cover 100. The transparent portions 120*a* and 120*b* are located in the front face 112 of the front piece 104. The transparent portion 120*c* is located in the back face 116 of the back piece 106. When the cover 100 is in the closed position, and as best shown in FIGS. 3 and 4, transparent portion 120*a* is substantially adjacent to an enclosed camera lens 124, transparent portion 120*b* is substantially adjacent an enclosed camera flash, and transparent portion 120*c* is substantially adjacent to an enclosed camera viewfinder. Preferably, the transparent portions 120 are integral to the housing 102 and are constructed of transparent polyurethane. Alternatively, the transparent portions 120 may be constructed of another suitable, transparent material such as glass, acryl or polycarbonate. When the transparent portions are not integral to the housing 102, the transparent portions may be attached to the housing 102 using suitable watertight means, such as a conventional frame and gasket. Preferably, the edge of the housing to which the transparent portion and corresponding frame are attached serves the function of the aforementioned gasket.

The present invention further includes resiliently deformable portions. The resiliently deformable portions are positioned in the housing to be substantially adjacent the enclosed camera's operable features that are required for taking photographs. The resiliently deformable portions are sufficiently deformable to allow the camera operator to operate the camera control features while the camera is enclosed in the cover.

In the preferred embodiment, the resiliently deformable portions are constructed of the same material and are the same thickness as the housing. If the housing is constructed of plastic resin, the preferred thickness for photographic equipment is between ⅛ and ¼ inch and the preferred thickness for electronic equipment with keypads or other operable features with closely spaced components is between ⅟₁₆ and ⅛ inch. Alternatively, the thickness and material of construction of the resiliently deformable portions each may vary, depending on the design objectives, such as the desired degree of transparency, durability, or deformability. For example, where additional ease of deformation is required, the thickness of the resiliently deformable portions may vary depending on the material used to construct the resiliently deformable portions. If additional elasticity is required to operate a particular operable feature, such as switch or dial operated features, then the resiliently deformable portions may be constructed to increase the operating range, such as achieved by a conventional bellows construction. Such design variations in material thickness and operating range are well known in the art.

As shown in FIG. 3, in the preferred embodiment, two resiliently deformable portions 126 and 128 are located in the back face 116 of the back piece 108. When a camera is enclosed in the cover 100, the resiliently deformable portion 126 is located substantially adjacent to and allows operation of the camera shutter control button for taking pictures, and the resiliently deformable portion 128 is located substantially adjacent to and allows operation of the camera flash control switch. In the preferred embodiment, the resiliently deformable portions 126, 128 are integral to the housing 102 and constructed of polyurethane. Alternatively, the resiliently deformable portions may be constructed of another suitable, water-resistant material. Resiliently deformable portions may be positioned and oriented adjacent to any part of the camera that requires manipulation by the operator. If the resiliently deformable portions are not integral to the housing, then they may be attached to the housing in a suitable watertight manner such as with a conventional frame and gasket.

The housing of the present invention further includes a housing entry for inserting the equipment into and removing the equipment from the cover 100. In the preferred embodiment, the housing 102 includes a single housing entry 200 comprising two edges 201. As shown in FIG. 5, the housing entry 200 is disposed along the sides 114 and 116 of the front piece 104 and back piece 106, respectively.

The housing of the preferred embodiment includes a sealing mechanism which allows the end-user to seal and reseal the housing as desired. The sealing mechanism 202 includes laterally opposite inter-engaging portions 203 disposed along the edges 201 of the housing entry 200. The sealing mechanism 202 is operable between open, closed, and intermediate positions. When the sealing mechanism 202 is in the fully closed position, as shown in FIG. 1, the interengaging portions 203 are engaged and the cover 100 is sealed in a watertight manner. When the sealing mechanism 202 is in the open position, as shown in FIG. 5, the interengaging portions 203 are disengaged and the housing entry 200 defines a housing opening. Preferably, the sealing mechanism 202 is a zipper and the interengaging portions 203 are zipper teeth. However, suitable alternative mechanisms may be used such as, for example, interengaging self-locking sealing lips of the type commonly found on resealable plastic containers. The sealing mechanism 202 may be attached to the housing 200 in a conventional, or other suitable, watertight manner such as with water-resistant adhesive bonding.

As shown in FIG. 5, the housing entry of the preferred embodiment further includes two sealing flaps 206 integral to the housing 102. One sealing flap 206a is disposed along one edge 201a and the other sealing flap 206b is disposed along the second edge 201b. Each sealing flap 206 is located in close proximity to and interiorly of the sealing mechanism 202. Each sealing flap 206 includes a sealing flap edge 208. The sealing flaps 206 and the sealing mechanism 202 are attached such that (as best shown in FIG. 7) as the laterally opposite interengaging portions 203 of the sealing mechanism 202 engage, the sealing flap edges 208a of one sealing flap 206a engage the laterally opposite sealing flap edges 208b of the second sealing flap 206b. In this manner, the housing entry 200 includes two barriers to water penetration.

Other embodiments of the invention will be apparent to those skilled in the art from consideration of the specification, claims and practice of the invention disclosed herein. It is intended that the specification and examples be considered exemplary.

What is claimed is:

1. A watertight equipment cover for enclosing equipment, including at least one operable feature, while permitting operation of the equipment, the cover comprising:
    a housing made from water-impermeable material, the housing including an inner surface and outer surface, the inner surface defining an interior chamber that substantially corresponds to the shape and configuration of the equipment;
    resiliently deformable portions generally corresponding in location to the operable features of the equipment for permitting operation of the operable features when the equipment is enclosed in the cover;
    a housing entry into the interior chamber, the housing entry including a resealable watertight sealing mechanism, wherein the resealable watertight sealing mechanism is disposed along the edge of the housing entry and operable between open, and closed positions, and wherein the housing entry includes at least one sealing flap disposed along the edge of the housing entry in close proximity to and interiorly of the resealable watertight sealing mechanism, the at least one sealing flap including laterally, outwardly facing sealing flap edges, whereby, when the resealable watertight sealing mechanism is in the closed position, the laterally opposite sealing flap edges are engaged in a watertight manner.

2. The watertight equipment cover of claim 1, wherein the housing is flexible and constructed of elastomer.

3. The watertight equipment cover of claim 1, wherein the housing is flexible and constructed of natural rubber.

4. The watertight equipment cover of claim 1, the housing further comprising transparent portions generally corresponding in location to any viewer areas of the equipment.

5. The watertight equipment cover of claim 4, wherein the transparent portions corresponding to the viewer areas are glass.

6. The watertight equipment cover of claim 4, wherein the transparent portions corresponding to the viewer areas are acryl.

7. The watertight equipment cover of claim 4, wherein the transparent portions corresponding to the viewer areas are polycarbonate.

8. The watertight equipment cover of claim 4, wherein the housing is transparent.

9. The watertight equipment cover of claim 4, wherein the transparent portions corresponding to the viewer areas are integral to the housing.

10. The watertight equipment cover of claim 1, wherein the resiliently deformable portions are integral to the housing.

11. The watertight equipment cover of claim 1, wherein the resealable watertight sealing mechanism is a zipper.

12. A camera, including at least one operable feature and at least one viewer area, and watertight equipment cover for enclosing the camera while permitting operation of the camera, comprising in combination:
    a camera;
    a housing made from water-impermeable material, the housing including
        an inner surface and outer surface, the inner surface defining an interior chamber that substantially corresponds to the shape and configuration of the camera;
        resiliently deformable portions generally corresponding in location to the operable features of the camera for permitting operation of the camera controls when the camera is enclosed in the cover;
        transparent portions generally corresponding in location to the viewer areas of the camera;
        a housing entry into the interior chamber, the housing entry including a resealable watertight sealing mechanism, wherein the resealable watertight sealing mechanism is disposed along the edge of the housing entry and operable between open, and closed positions, and wherein the housing entry includes at least one sealing flap disposed along the edge of the housing entry in close proximity to and interiorly of the resealable watertight sealing mechanism, the at least one sealing flap including laterally, outwardly facing sealing flap edges, whereby, when the resealable watertight sealing mechanism is in the closed position, the laterally opposite sealing flap edges are engaged in a watertight manner.

13. The camera and watertight equipment cover of claim 12, wherein the housing is flexible and constructed of elastomer.

14. The camera and watertight equipment cover of claim 12, wherein the housing is flexible and constructed of natural rubber.

15. The camera and watertight equipment cover of claim 12, wherein the housing is transparent.

16. The camera and watertight equipment cover of claim 12, wherein the transparent portions corresponding to the viewer areas are integral to the housing.

17. The camera and watertight equipment cover of claim 12, wherein the transparent portions corresponding to the viewer areas are glass.

18. The camera and watertight equipment cover of claim 12, wherein the transparent portions corresponding to the viewer areas are acryl.

19. The camera and watertight equipment cover of claim 12, wherein the transparent portions corresponding to the viewer areas are polycarbonate.

20. The camera and watertight equipment cover of claim 12, wherein the viewer areas of the camera are the lens and viewfinder.

21. The camera and watertight equipment cover of claim 12, wherein the resiliently deformable portions are integral to the housing.

22. The camera and watertight equipment cover of claim 12, wherein the operable features are the camera shutter control button and the camera flash control switch.

23. The camera and watertight equipment cover of claim 14, wherein the resealable watertight sealing mechanism is a zipper.

24. An item of portable equipment, including at least one operable feature, and a watertight equipment cover for enclosing the equipment while permitting operation of the equipment, the cover comprising:

a housing made from water-impermeable material, the housing including an inner surface and outer surface, the inner surface defining an interior chamber that substantially corresponds to the shape and configuration of the equipment;

resiliently deformable portions generally corresponding in location to the operable features of the equipment for permitting operation of the equipment controls when the equipment is enclosed in the cover;

a housing entry into the interior chamber, the housing entry including a resealable watertight sealing mechanism, wherein the resealable watertight sealing mechanism is disposed along the edge of the housing entry and operable between open, and closed positions, and wherein the housing entry includes at least one sealing flap disposed along the edge of the housing entry in close proximity to and interiorly of the resealable watertight sealing mechanism, the at least one sealing flap including laterally, outwardly facing sealing flap edges, whereby, when the resealable watertight sealing mechanism is in the closed position, the laterally opposite sealing flap edges are engaged in a watertight manner.

25. The portable equipment and watertight equipment cover of claim 24, wherein the housing is flexible and constructed of elastomer.

26. The portable equipment and watertight equipment cover of claim 24, wherein the housing is flexible and constructed of natural rubber.

27. The portable equipment and watertight equipment cover of claim 24, further comprising transparent portions generally corresponding in location to one or more viewer areas of the equipment.

28. The portable equipment and watertight equipment cover of claim 27, wherein the transparent portions corresponding to the viewer areas are glass.

29. The portable equipment and watertight equipment cover of claim 27, wherein the transparent portions corresponding to the viewer areas are acryl.

30. The portable equipment and watertight equipment cover of claim 27, wherein the transparent portions corresponding to the viewer areas are polycarbonate.

31. The portable equipment and watertight equipment cover of claim 27, wherein the viewer area of the equipment is a view screen and a keyboard.

32. The portable equipment and watertight equipment cover of claim 27, wherein the viewer area is a keypad.

33. The portable equipment and watertight equipment cover of claim 27, wherein the housing is transparent.

34. The portable equipment and watertight equipment cover of claim 27, wherein the transparent portions corresponding to the viewer areas are integral to the housing.

35. The portable equipment and watertight equipment cover of claim 24, wherein the resiliently deformable portions are integral to the housing.

36. The portable equipment and watertight equipment cover of claim 24, wherein the operable features of the equipment are the keypad and on-off button.

37. The portable equipment and watertight equipment cover of claim 24, wherein the operable features of the equipment are the keyboard, contrast and brightness dial, and the on-off button.

38. The portable equipment and watertight equipment cover of claim 24, wherein the resealable watertight sealing mechanism is a zipper.

* * * * *